(12) United States Patent
Lewis et al.

(10) Patent No.: US 10,641,097 B2
(45) Date of Patent: May 5, 2020

(54) TURBINE BLADE WITH AIRFOIL TIP VORTEX CONTROL

(71) Applicant: United Technologies Corporation, Farmington, CT (US)

(72) Inventors: Scott D. Lewis, Vernon, CT (US); Kyle C. Lana, Portland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 613 days.

(21) Appl. No.: 15/018,072

(22) Filed: Feb. 8, 2016

(65) Prior Publication Data

US 2017/0145828 A1 May 25, 2017

Related U.S. Application Data

(60) Provisional application No. 62/258,834, filed on Nov. 23, 2015.

(51) Int. Cl.
  *F01D 5/06* (2006.01)
  *F01D 5/14* (2006.01)
  (Continued)

(52) U.S. Cl.
  CPC .............. *F01D 5/145* (2013.01); *F01D 5/06* (2013.01); *F01D 5/141* (2013.01); *F01D 5/20* (2013.01); *F01D 11/08* (2013.01); *F02C 3/04* (2013.01); *F04D 29/324* (2013.01); *F04D 29/681* (2013.01); *F05D 2220/32* (2013.01); *F05D 2240/305* (2013.01); *F05D 2240/307* (2013.01); *F05D 2240/35* (2013.01); *F05D 2250/711* (2013.01); *F05D 2250/712* (2013.01)

(58) Field of Classification Search
  CPC . F01D 5/06; F01D 5/141; F01D 5/145; F01D 5/20; F01D 11/08; F02C 3/04; F04D 29/324; F04D 29/681; F05D 2220/32; F05D 2240/305; F05D 2240/307; F05D 2240/35; F05D 2250/711; F05D 2250/712
  See application file for complete search history.

(56) References Cited

U.S. PATENT DOCUMENTS 7,581,930 B2  9/2009  Aggarwala
7,972,115 B2  7/2011  Potier
(Continued)

FOREIGN PATENT DOCUMENTS

EP   2333242 A2    6/2011
WO   2015094498 A1  6/2015

OTHER PUBLICATIONS

Non Final Office Action for U.S. Appl. No. 15/018,025, dated Nov. 29, 2019, 13 pages.

*Primary Examiner* — Igor Kershteyn
(74) *Attorney, Agent, or Firm* — Cantor Colburn LLP

(57) ABSTRACT

A rotor blade for a gas turbine engine is provided. The rotor blade having: an attachment; an airfoil extending from the attachment to a tip; and a tip shelf located in a surface of the tip proximate to a pressure side of the airfoil, wherein the tip shelf has a ledge portion extending from the pressure side to a wall portion extending upwardly from the ledge portion to the tip and wherein the wall portion is configured to have a convex portion with respect to the pressure side of the airfoil as it extends from a leading edge to a trailing edge of the airfoil.

20 Claims, 11 Drawing Sheets

(51) Int. Cl.
 F02C 3/04 (2006.01)
 F04D 29/32 (2006.01)
 F04D 29/68 (2006.01)
 F01D 5/20 (2006.01)
 F01D 11/08 (2006.01)

(56) References Cited

U.S. PATENT DOCUMENTS

| | | |
|---|---|---|
| 8,303,254 B1 | 11/2012 | Liang |
| 8,360,731 B2 | 1/2013 | Nash et al. |
| 8,439,643 B2 | 5/2013 | Kuhne |
| 8,632,311 B2 | 1/2014 | Klasing et al. |
| 8,777,572 B2 | 7/2014 | Cheong et al. |
| 9,017,036 B2 | 4/2015 | Straccia |
| 9,255,481 B2 | 2/2016 | Lim |
| 2003/0059309 A1 | 3/2003 | Szucs et al. |
| 2006/0051209 A1* | 3/2006 | Lee ........................ F01D 5/186 |
| | | 416/97 R |
| 2007/0258815 A1* | 11/2007 | Liang ...................... F01D 5/20 |
| | | 416/97 R |
| 2008/0044289 A1 | 2/2008 | Klasing et al. |
| 2008/0044291 A1* | 2/2008 | Lee ........................ F01D 5/145 |
| | | 416/235 |
| 2010/0303625 A1* | 12/2010 | Kuhne ..................... F01D 5/20 |
| | | 416/91 |
| 2011/0135482 A1* | 6/2011 | Nash ....................... F01D 5/141 |
| | | 416/223 A |
| 2014/0030102 A1 | 1/2014 | Mishra et al. |
| 2015/0345301 A1 | 12/2015 | Zhang |
| 2016/0265366 A1 | 9/2016 | Snyder et al. |
| 2016/0298463 A1* | 10/2016 | Auxier ................... F01D 5/186 |
| 2016/0319672 A1 | 11/2016 | Jones et al. |
| 2017/0167275 A1 | 6/2017 | Schroeder et al. |

* cited by examiner

TURBINE BLADE WITH AIRFOIL TIP VORTEX CONTROL

CROSS REFERENCE TO RELATED APPLICATIONS

This application claims the benefit of U.S. Provisional Patent Application Ser. No. 62/258,834, filed Nov. 23, 2015, the entire contents of which are incorporated herein by reference thereto.

BACKGROUND

This disclosure relates generally to gas turbine engines and, more particularly, to rotor blades for gas turbine engines.

Typically, a rotor blade for a gas turbine engine includes an attachment (also referred to as an "attachment region") and an airfoil. The airfoil extends between the attachment and a tip and has a concave pressure side surface, a convex suction side surface, a leading edge and a trailing edge. The airfoil is sized such that when it is configured within the engine, a clearance gap is defined between the blade tip and the surrounding static structure (outer flowpath).

During operation, a stagnation point is formed near the leading edge of the airfoil. A stagnation point may be defined as a point in a flow field where velocity of the airflow is approximately zero. At the stagnation point, the airflow separates into a pressure side airflow and a suction side airflow. The pressure side airflow travels from the stagnation point to the trailing edge. The suction side airflow is accelerated around the leading edge and a portion of the suction side surface until it reaches a point of maximum velocity. Typically, the point of maximum velocity corresponds to a point on the suction side surface where the surface becomes relatively flat as compared to a relatively curved portion of the airfoil proximate the leading edge. Thereafter, the suction side airflow decelerates as it travels from the point of maximum velocity to the trailing edge of the airfoil.

Near the tip of the airfoil, a portion of the pressure side airflow (i.e., a leakage airflow) migrates through the tip clearance gap to the suction side airflow. This leakage airflow mixes with the suction side airflow forming a vortex. The vortex mixes out and disperses, causing relatively significant flow disturbances along the majority of the suction side surface. As a collective result of these flow disturbances, the efficiency of the engine is reduced.

Several approaches have been adopted to try to reduce the detrimental effects associated with leakage airflows. In one approach, the clearance gap is decreased by reducing tolerances between the tip of each rotor blade and the outer flowpath. This approach has met with limited success because the tolerances must still account for thermal and centrifugal expansion of materials to prevent interference. In another approach, a shroud is attached to the tips of the rotor blades. Although air may still leak between the shroud and the outer, static flowpath, the vortex induced losses are reduced. A downside to this approach is that a shroud typically adds a significant amount of mass to the rotor, which may limit rotor operational speeds and temperatures.

Accordingly, it is desirable to provide turbine airfoils and/or engines with airfoils that reduce the detrimental effects associated with leakage airflows.

BRIEF DESCRIPTION

In one embodiment, a rotor blade for a gas turbine engine is provided. The rotor blade having: an attachment; an airfoil extending from the attachment to a tip; and a squealer pocket located in a surface of the tip, wherein the squealer pocket is at least partially surrounded by a first surface of a wall located between the squealer pocket and a pressure side of the airfoil, wherein the first surface of the wall has a convex configuration with respect to the pressure side of the airfoil as it extends from a leading edge to a trailing edge of the airfoil.

In addition to one or more of the features described above, or as an alternative to any of the foregoing embodiments, the airfoil may have a stagger angle that changes as the airfoil extends between the attachment and the tip, the airfoil further comprising a base region disposed adjacent to the attachment, a tip region, and a transition region located between the base region and the tip region; wherein a rate of the change of the stagger angle in the transition region is greater than a rate of the change of the stagger angle in the base region; wherein the rate of the change of the stagger angle in the transition region is greater than a rate of change of the stagger angle in the tip region; and wherein the airfoil has a chord that increases as the airfoil extends from the base region to the tip.

In addition to one or more of the features described above, or as an alternative to any of the foregoing embodiments, the squealer pocket may be at least partially surrounded by a second surface of a wall located between the squealer pocket and a suction side of the airfoil, wherein the second surface of the wall has a convex configuration with respect to the suction side of the airfoil as it extends from the leading edge to the trailing edge of the airfoil.

In addition to one or more of the features described above, or as an alternative to any of the foregoing embodiments, the first surface and the second surface may be in a facing spaced relationship with respect to each other and the squealer pocket is located between the first surface and the second surface.

In addition to one or more of the features described above, or as an alternative to any of the foregoing embodiments, the second surface may be partially curved and parallel to the suction side of the airfoil proximate to the tip.

In addition to one or more of the features described above, or as an alternative to any of the foregoing embodiments, the second surface may be partially curved and parallel to the suction side of the airfoil proximate to the tip.

In addition to one or more of the features described above, or as an alternative to any of the foregoing embodiments, the tip region may have a substantially planar pressure side surface.

In addition to one or more of the features described above, or as an alternative to any of the foregoing embodiments, the tip region may have a chord line and a pressure side surface, and wherein the chord line is substantially parallel to the pressure side surface.

In addition to one or more of the features described above, or as an alternative to any of the foregoing embodiments, the chord may increase as the airfoil extends from the attachment to the tip.

In addition to one or more of the features described above, or as an alternative to any of the foregoing embodiments, the chord may change as the airfoil extends between the attachment and the tip, wherein a rate of change of the chord in the transition region is greater than a rate of change of the chord in the base region, and wherein the rate of change of the chord in the transition region is greater than a rate of change of the chord in the tip region.

In addition to one or more of the features described above, or as an alternative to any of the foregoing embodiments, the chord of the airfoil may increase from the base region to the tip region.

In addition to one or more of the features described above, or as an alternative to any of the foregoing embodiments, the airfoil may have a span, and wherein the tip region has a height equal to or less than approximately 25 percent of the span.

In addition to one or more of the features described above, or as an alternative to any of the foregoing embodiments, the airfoil may have a span, and wherein the transition region has a height equal to approximately 25 percent of the span.

In addition to one or more of the features described above, or as an alternative to any of the foregoing embodiments, the airfoil may have a span, and wherein the base region has a height equal to approximately 50 percent of the span.

In addition to one or more of the features described above, or as an alternative to any of the foregoing embodiments, the tip region may have a substantially planar pressure side surface.

In addition to one or more of the features described above, or as an alternative to any of the foregoing embodiments, the tip region may have a chord line and a pressure side surface, and wherein the chord line is substantially parallel to the pressure side surface.

In addition to one or more of the features described above, or as an alternative to any of the foregoing embodiments, the chord may increase as the airfoil extends from the attachment to the tip.

In addition to one or more of the features described above, or as an alternative to any of the foregoing embodiments, the chord may change as the airfoil extends between the attachment and the tip, wherein a rate of change of the chord in the transition region is greater than a rate of change of the chord in the base region, and wherein the rate of change of the chord in the transition region is greater than a rate of change of the chord in the tip region.

In addition to one or more of the features described above, or as an alternative to any of the foregoing embodiments, the chord of the airfoil may increase from the base region to the tip region.

In yet another embodiment, a gas turbine engine is provided. The gas turbine engine having: a compressor section; a combustor section; and a turbine section; wherein the turbine section includes a plurality of rotors having a plurality of radially disposed rotor blades at least some of the plurality of radially disposed rotor blades having: an attachment; an airfoil extending from the attachment to a tip; and a squealer pocket located in a surface of the tip, wherein the squealer pocket is at least partially surrounded by a first surface of a wall located between the squealer pocket and a pressure side of the airfoil, wherein the first surface of the wall has a convex configuration with respect to the pressure side of the airfoil as it extends from a leading edge to a trailing edge of the airfoil.

In yet another embodiment, a rotor blade for a gas turbine engine is provided. The rotor blade having: an attachment; an airfoil extending from the attachment to a tip; and a tip shelf located in a surface of the tip proximate to a pressure side of the airfoil, wherein the tip shelf has a ledge portion extending from the pressure side to a wall portion extending upwardly from the ledge portion to the tip and wherein the wall portion is configured to have a convex portion with respect to the pressure side of the airfoil as it extends from a leading edge to a trailing edge of the airfoil.

In still yet another embodiment, a rotor blade for a gas turbine engine is provided. The rotor blade having: an attachment; an airfoil extending from the attachment to a tip; a tip shelf located in a surface of the tip proximate to a pressure side of the airfoil; and wherein the airfoil has a stagger angle that changes as the airfoil extends between the attachment and the tip, the airfoil further comprising a base region disposed adjacent to the attachment, a tip region, and a transition region located between the base region and the tip region; wherein a rate of the change of the stagger angle in the transition region is greater than a rate of the change of the stagger angle in the base region; wherein the rate of the change of the stagger angle in the transition region is greater than a rate of change of the stagger angle in the tip region; and wherein the airfoil has a chord that increases as the airfoil extends from the base region to the tip, wherein the tip shelf has a ledge portion extending from the pressure side to a wall portion extending upwardly from the ledge portion to the tip.

In addition to one or more of the features described above, or as an alternative to any of the foregoing embodiments, the wall portion may be generally flat and straight and is parallel to the pressure side proximate to the tip shelf.

In addition to one or more of the features described above, or as an alternative to any of the foregoing embodiments, the ledge portion may have a concave portion that results in the wall portion having varying heights as it extends upwardly from the ledge portion.

In addition to one or more of the features described above, or as an alternative to any of the foregoing embodiments, the ledge portion may have a convex portion that results in the wall portion having varying heights as it extends upwardly from the ledge portion.

In addition to one or more of the features described above, or as an alternative to any of the foregoing embodiments, the ledge portion may also have a convex portion that results in the wall portion having varying heights as it extends upwardly from the ledge portion wherein the convex portion of the ledge portion is located proximate to the trailing edge of the airfoil and wherein the concave portion of the ledge comprises greater than 50% of the ledge portion.

In addition to one or more of the features described above, or as an alternative to any of the foregoing embodiments, the wall portion may be configured to have a convex portion with respect to the pressure side of the airfoil as it extends from a leading edge to a trailing edge of the airfoil.

In addition to one or more of the features described above, or as an alternative to any of the foregoing embodiments, the convex portion of the wall portion comprises at least 50% of the wall portion that extends from the leading edge to the trailing edge of the airfoil.

In addition to one or more of the features described above, or as an alternative to any of the foregoing embodiments, further embodiments may include a squealer pocket located in a surface of the tip.

In addition to one or more of the features described above, or as an alternative to any of the foregoing embodiments, another portion of the wall portion may be concave with respect to pressure side of the airfoil and the another portion is located proximate to the trailing edge of the airfoil.

In addition to one or more of the features described above, or as an alternative to any of the foregoing embodiments, the squealer pocket may be at least partially surrounded by a first surface of a wall located between the squealer pocket and the pressure side of the airfoil, wherein the first surface of the wall has a convex configuration with respect to the pressure side of the airfoil as it extends from a leading edge to a trailing edge of the airfoil.

In addition to one or more of the features described above, or as an alternative to any of the foregoing embodiments, the squealer pocket may be at least partially surrounded by a second surface of a wall located between the squealer pocket and a suction side of the airfoil, wherein the second surface of the wall has a convex configuration with respect to the suction side of the airfoil as it extends from the leading edge to the trailing edge of the airfoil.

In addition to one or more of the features described above, or as an alternative to any of the foregoing embodiments, the first surface and the second surface may be in a facing spaced relationship with respect to each other and the squealer pocket is located between the first surface and the second surface.

In yet another embodiment, a gas turbine engine is provided. The gas turbine engine having: a compressor section; a combustor section; and a turbine section; wherein at least one of the turbine section and compressor section includes a plurality of rotors having a plurality of radially disposed rotor blades at least some of the plurality of radially disposed rotor blades having: an attachment; an airfoil extending from the attachment to a tip; a tip shelf located in a surface of the tip proximate to a pressure side of the airfoil, wherein the tip shelf has a ledge portion extending from the pressure side to a wall portion extending upwardly from the ledge portion to the tip and wherein the wall portion is configured to have a convex portion with respect to the pressure side of the airfoil as it extends from a leading edge to a trailing edge of the airfoil.

In addition to one or more of the features described above, or as an alternative to any of the foregoing embodiments, the wall portion may further include a concave portion that is located proximate to the trailing edge of the airfoil.

In addition to one or more of the features described above, or as an alternative to any of the foregoing embodiments, further embodiments may include a squealer pocket located in a surface of the tip.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
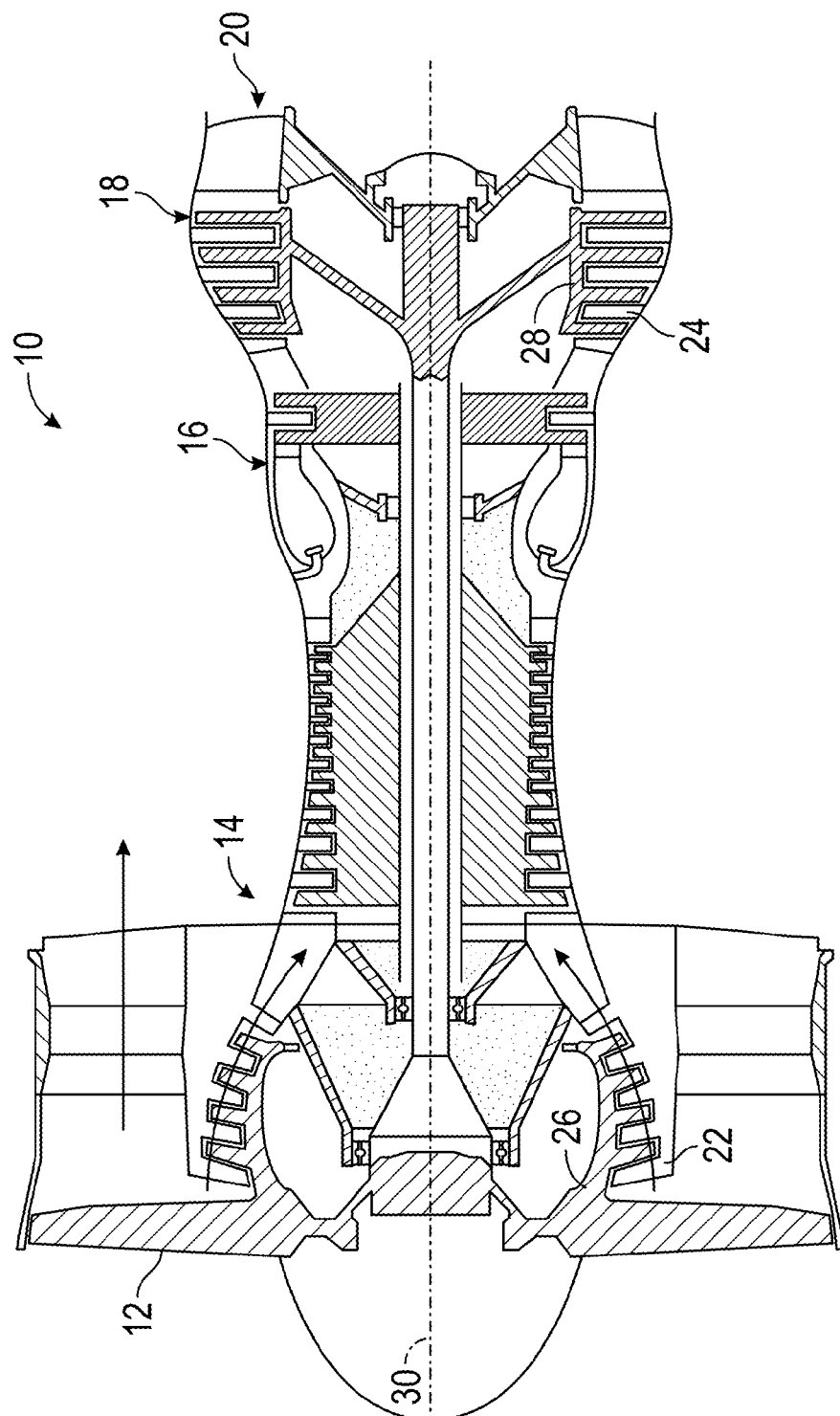
FIG. 1 is a cross-sectional view of a gas turbine engine.

Various embodiments of the present disclosure are related to turbine blades with airfoil tip vortex control. In particular and in non-limiting embodiments, various embodiments of the disclosure are related to the aforementioned turbine blades with airfoil tip vortex control configured for use in gas turbine engines and methods for cooling the blade tips of the airfoils. Although engine airfoils are discussed herein, it is understood that embodiments of this disclosure may be applied on any turbomachinery component that requires airfoil tip vortex control.

In accordance with various embodiments of this disclosure a rotor blade for a gas turbine engine is provided. The rotor blade having an airfoil extending from an attachment to a tip and a squealer pocket and/or a tip shelf located in a surface of the tip; and the airfoil also has a stagger angle that changes as the airfoil extends between the attachment and the tip. In addition, the squealer pocket and/or tip shelf of may be of any size and aspect ratio along the tip chord. Reference is also made to U.S. Pat. No. 8,360,731, the entire contents of which are incorporated herein by reference thereto.

Various embodiments of this disclosure may be applied on any turbomachinery component that requires airfoil tip vortex control. For example, gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

Gas turbine engines provide efficient, reliable power for a wide range of applications, including aviation and industrial power generation. Smaller-scale engines such as auxiliary power units typically utilize a one-spool design, with co-rotating compressor and turbine sections. Larger-scale jet engines and industrial gas turbines are generally arranged into a number of coaxially nested spools, which operate at different pressures and temperatures, and rotate at different speeds.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Aviation applications include turbojet, turbofan, turboprop and turboshaft engines. In turbojet engines, thrust is generated primarily from the exhaust. Modern fixed-wing aircraft generally employ turbofan and turboprop designs, in which the low pressure spool is coupled to a propulsion fan or propeller. Turboshaft engines are typically used on rotary-wing aircraft, including helicopters.

Turbofan engines are commonly divided into high and low bypass configurations. High bypass turbofans generate thrust primarily from the fan, which drives airflow through a bypass duct oriented around the engine core. This design is common on commercial aircraft and military transports, where noise and fuel efficiency are primary concerns. Low bypass turbofans generate proportionally more thrust from the exhaust flow, providing greater specific thrust for use on high-performance aircraft, including supersonic jet fighters. Unducted (open rotor) turbofans and ducted propeller engines are also known, in a variety of counter-rotating and aft-mounted configurations.

Turbofan engine performance depends on precise control of the working fluid flow, including flow across the airfoil tip. Where clearance, abrasion and temperature effects are of concern, moreover, these factors often pose competing design demands on compressor and turbine rotor geometry, particularly in the tip region of the airfoil.

Referring to FIG. 1, a gas turbine engine 10 includes a fan 12, a compressor section 14, a combustor section 16, a turbine section 18, and a nozzle 20. The compressor and turbine sections 14, 18 each include a plurality of stator vane stages 22, 24 and rotor stages 26, 28. Each stator vane stage 22, 24 includes a plurality of stator vanes that guide air into or out of a rotor stage in a manner designed in part to optimize performance of that rotor stage. Each rotor stage 26, 28 includes a plurality of rotor blades attached to a rotor disk. The rotor stages 26, 28 within the compressor and turbine sections 14, 18 are rotatable about a longitudinally extending axis 30 of the engine 10.

Figure 2:
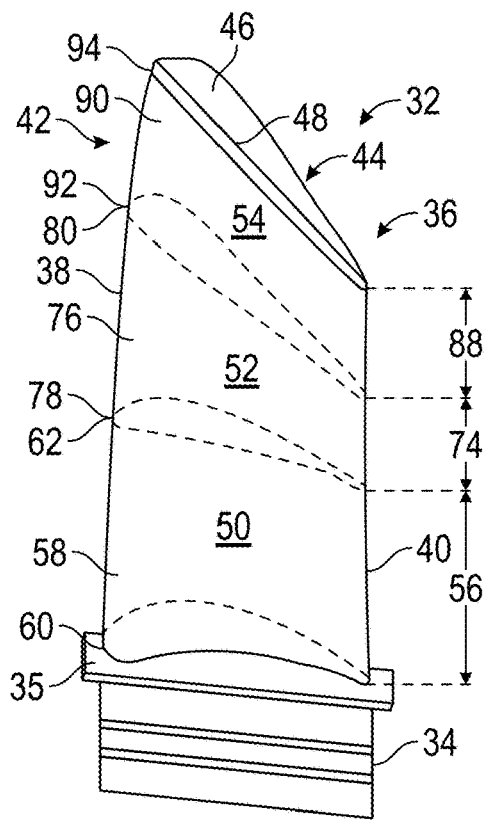
FIG. 2 is a diagrammatic illustration of a rotor blade for the gas turbine engine in FIG. 1.

FIG. 2 is a diagrammatic illustration of one embodiment of a rotor blade 32 for use in the turbine section 18 of the gas turbine engine 10. The rotor blade 32 includes an attachment 34, a platform 35, and an airfoil 36. Some embodiments of the rotor blade 32 do not include the platform 35. To simplify the description herein, the attachment 34 may be considered as including the platform 35 for purposes of defining the beginning of the airfoil 36. The rotor blade attachment 34 is adapted to be received within a slot disposed within a rotor disk. Rotor blade attachments are well known in the art, and the present disclosure is not limited to any particular attachment configuration.

Figure 3:
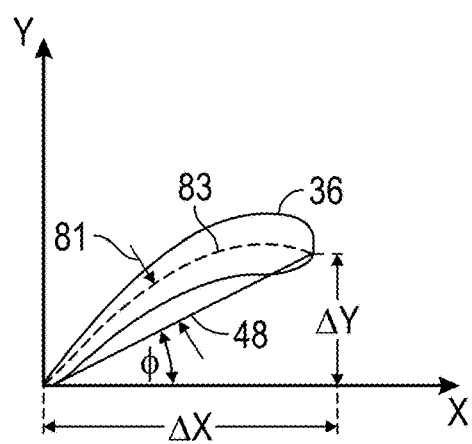
FIG. 3 is a diagrammatic illustration of a cross-sectional slice of an airfoil.

The airfoil 36 has a leading edge 38, a trailing edge 40, a pressure side 42, a suction side 44, a stagger angle Φ, a chord and a camber line. The stagger angle q changes as the airfoil 36 extends between the attachment 34 and a tip 46 (e.g., the stagger angle increases in a direction defined by a line that starts at the attachment 34 and travels along the span of the airfoil 36 toward the tip 46). Referring to FIG. 3, the stagger angle Φ is defined as the angle between a chord line 48 of the airfoil 36 and an axis (e.g., the longitudinally extending axis 30 of the gas turbine engine 10, etc.). Therefore, the stagger angle Φ for one cross-sectional "slice" of the airfoil 36 may be calculated using the following equation: $\Phi_{stagger} = \tan^{-1}(\Delta y/\Delta x)$ where $\Delta y$ is indicative of a distance between tips of the leading and the trailing edges 38, 40 of the airfoil 36 along a y-axis, and $\Delta x$ is indicative of a distance between the tips of the leading and the trailing edges 38, 40 of the airfoil 36 along an x-axis. Additionally, or alternatively, the chord of the airfoil 36 changes as the airfoil 36 extends between the attachment 34 and the tip 46; e.g., the airfoil chord increases in a direction defined by a line that starts at the attachment 34 and travels along the span of the airfoil 36 toward the tip 46. Referring again to FIG. 2, the airfoil 36 includes a base region 50, a transition region 52 and a tip region 54.

The base region 50 has a base height 56, a pressure side surface 58, and a suction side surface (not shown). The base height 56 extends between a first end 60 (also referred to as a "root") and a second end 62. The root 60 is located at a cross-sectional "slice" of the airfoil 36 where the base region 50 abuts the attachment 34. The second end 62 is located at a cross-sectional "slice" of the airfoil 36 where the base region 50 abuts the transition region 52. In some embodiments, the base height 56 is approximately 50% of the span of the airfoil 36. The root 60 and the second end 62 each have a stagger angle 64, 66, a chord 68, 70 and camber 69, 71. Referring to the embodiment in FIG. 4, the airfoil stagger angle increases within the base region 50 in a direction defined by a line 72 that starts at the root 60 and travels toward the second end 62; i.e., the stagger angle 66 at the second end 62 is greater than the stagger angle 64 at the root 60. Additionally, or alternatively, the airfoil chord increases within the base region 50 in a direction defined by the line 72 that starts at the root 60 and travels toward the second end 62; i.e., the chord 70 at the second end 62 is greater than the chord 68 at the root 60. One or both the stagger angle rate of change and the chord rate of change within the base region 50 may be constant or may vary. Where either one of the stagger angle and the chord rates of change vary, an average stagger angle rate of change and/or an average chord rate of change may be used to respectively define the above referenced rates of change within the base region 50. The pressure side surface 58 is concave and the suction side surface is convex. In some embodiments, the base region 50 additionally has non-uniform camber. Referring to FIG. 3, camber can be defined as a rise 81 (e.g., distance) between a camber line 83 (also referred to as a "mean camber line") and a chord line 48. For example, referring to the embodiment in FIG. 4, the camber of the base region 50 can decrease in the direction defined by the line 72 such that camber 69 of the root 60 is greater than the camber 71 of the second end 62.

Figure 4:
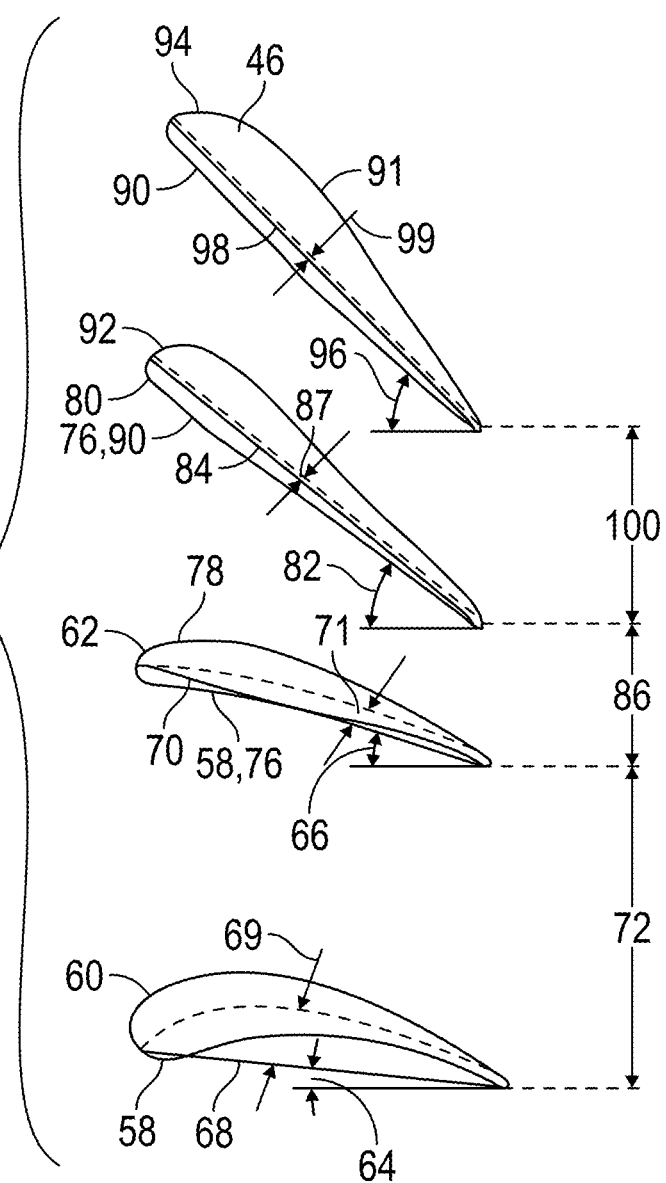
FIG. 4 is a diagrammatic illustration of cross-sectional slices of an airfoil.

Referring to FIG. 2, the transition region 52 has a transition height 74, a pressure side surface 76 and a suction side surface (not shown). The transition height 74 extends between a first end 78 and a second end 80. The first end 78 is located at the same cross-sectional "slice" of the airfoil 36 as the second end 62 of the base region 50. The second end 80 is located at a cross-sectional "slice" of the airfoil 36 where the transition region 52 abuts the tip region 54. In some embodiments, the transition region 52 is approximately 25% of the span of the airfoil 36. The first end 78 and the second end 80 each have a stagger angle 66, 82, a chord 70, 84 and camber 71, 87. Referring to FIG. 4, the airfoil stagger angle increases within the transition region 52 in a direction defined by a line 86 that starts at the first end 78 and travels towards the second end 80; i.e., the stagger angle 82 at the second end 80 is greater than the stagger angle 66 at the first end 78. Additionally or alternatively, the airfoil chord increases within the transition region 52 in a direction defined by the line 86 that starts at the first end 78 and travels toward the second end 80; i.e., the chord 84 at the second end 80 is greater than the chord 70 at the first end 78. One or both of the stagger angle rate of change and the chord rate of change within the transition region 52 may be constant or may vary. Where either one or both of the stagger angle and chord rates of change vary, an average stagger angle rate of change and/or an average chord rate of change may be used to respectively define the above referenced rates of change within the base region 50. The pressure side surface 76 is concave and the suction side surface is convex. In some embodiments, the transition region 52 additionally has non-uniform camber. For example, the camber of the transition region 52 can decrease in the direction defined by the line 86 such that the camber 71 of the first end 78 is greater than the camber 87 of the second end 80.

Referring to FIG. 2, the tip region 54 has a tip height 88, a pressure side surface 90 and a suction side surface 91. The tip height 88 extends between a first end 92 and a second end 94 (i.e., the tip 46 of the airfoil 36). The first end 92 is located at the same cross-section "slice" of the airfoil 36 as the second end 80 of the transition region 52. In some embodiments, the tip region 54 is approximately 20-25% of the span of the airfoil 36. The first end 92 and the second end 94 each have a stagger angle 82, 96, a chord 84, 98, and camber 87, 99. Referring to FIG. 4, the airfoil stagger angle increases within the tip region 54 in a direction defined by a line 100 that starts at the first end 92 and travels towards the second end 94; i.e., the stagger angle 96 at the second end 94 is greater than the stagger angle 82 at the first end 92. Additionally or alternatively, the airfoil chord increases within the tip region 54 in a direction defined by the line 100 that starts at the first end 92 and travels towards the second end 94; i.e., the chord 98 at the second end 94 is greater that the chord 84 at the first end 92. Notably, one or both of the stagger angle rate of change and the chord rate of change within the tip region 54 may be constant or may vary. Where either one or both of the stagger angle and chord rates of change vary, an average stagger angle rate of change and/or an average chord rate of change may be used to respectively define the above referenced rates of change within the base region 50. The pressure side surface 90 is substantially planar. For example, in one embodiment, a chord line (e.g., the chordline 84, 98) of the tip region 54 is substantially parallel to the pressure side surface 90 between the first and the second ends 92, 94. The suction side surface 91 is generally convex. In some embodiments, the tip region 54 has substantially uniform camber. For example, the camber 87 of the first end 92 may be substantially equal to the camber 99 of the second end 94.

Referring to FIG. 2, the base region 50 is disposed adjacent to the attachment 34. The transition region 52 is located between the base and the tip regions 50, 54. Referring to the embodiment in FIG. 4, the airfoil 36 (i.e., the base, transition and tip regions 50, 52, 54) is configured such that the stagger angle rate of change for the transition region 52 is greater that the stagger angle rates of change for the base and the tip regions 50, 54, respectively. The airfoil 36 is additionally, or alternatively, configured such that the chord rate of change for the transition region 52 is greater than the chord rates of change for the base and the tip regions 50, 54, respectively.

Figure 5A:
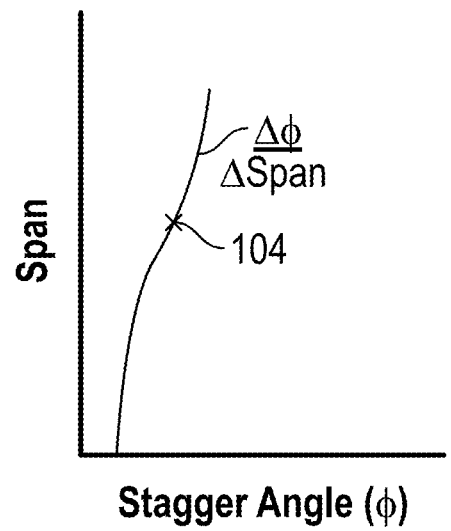
FIG. 5A is a graph illustrating stagger angle rates of change of the airfoil between an attachment and a tip.
Figure 5B:
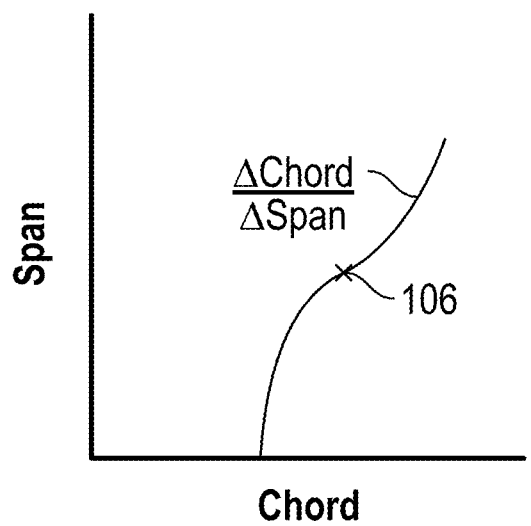
FIG. 5B is a graph illustrating chord rates of change of the airfoil between the attachment and the tip.

FIG. 5A is a graph illustrating the stagger angle rates of change (i.e., ΔΦ/Δ (span)) of the airfoil 36 between the attachment 34 and the tip 46. The horizontal axis represents the stagger angle (Φ) and the vertical axis represents a distance along the span of the airfoil 36. FIG. 5B is a graph illustrating the chord rates of change (i.e., Δ (chord)/Δ (span)) of the airfoil 36 between the attachment 34 and the tip 46. The horizontal axis represents the chord and the vertical axis represents a distance along the span of the airfoil 36. As illustrated in FIGS. 5A and 5B, the transition region 52 has a point of inflection 104, 106 where the curvatures of the lines change from a negative value to a positive value. Significantly, it is believed that this inflection permits the base and the tip regions 50, 54 to have relatively independent airflow characteristics. That is, for example, the airfoil 36 may be configured such that the base region 50 utilizes typical airflow characteristics, while the tip region 54 utilizes airflow characteristics designed to reduce flow disturbances induced by a leakage airflow. The airflow characteristics of the tip region 54 will be described below in further detail.

Figure 6:
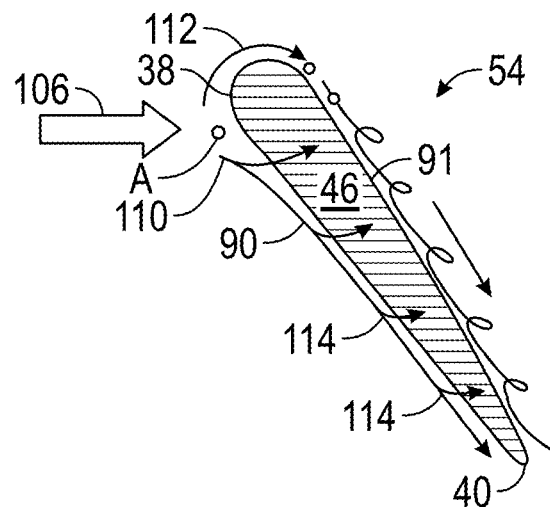
FIG. 6 is a diagrammatic illustration of airflow characteristics of a tip region of the airfoil in FIGS. 2 and 4.
Figure 7:
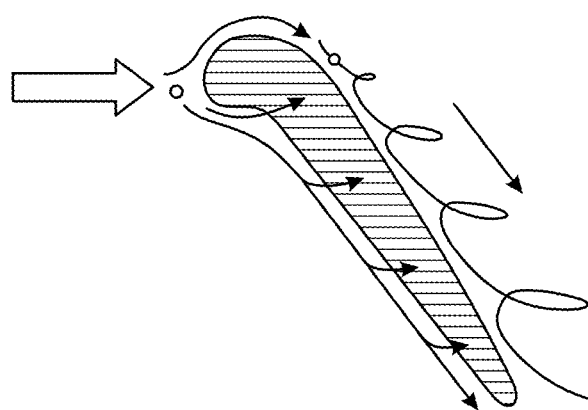
FIG. 7 is a diagrammatic illustration of airflow characteristics of a prior art rotor blade near a tip thereof.

FIG. 6 is a diagrammatic illustration of the tip region 54 of the airfoil 36 in FIGS. 2 and 4. Referring to FIG. 6, in operation, a stagnation point (e.g., point "A") forms within an airflow 108 adjacent the pressure side surface 90 of the tip region 54 proximate the leading edge 38. As set forth above, a stagnation point may be defined as a point in a flow field where velocity of the airflow is approximately zero. At the stagnation point "A", the airflow 108 is divided into a pressure side airflow 110 and a suction side airflow 112.

The pressure side airflow 110 is directed, parallel to the pressure side surface 90, from the stagnation point "A" towards the trailing edge 40. As the pressure side airflow 110 travels towards the trailing edge 40, a portion thereof (i.e., a leakage airflow 114) migrates over the tip 46 of the airfoil 36 from the pressure side airflow 110 to the suction side airflow 112.

The leakage airflow 114 reduces the efficiency of the turbine via the unrealized work extraction that the leakage air represents and also through increased mixing losses as the leakage air is reintroduced with the mainstream suction side flow. The leakage airflow and the manner in which it mixes upon exiting the tip gap on the suction side are a function of the local pressure distribution around the blade tip. In contrast to prior art rotor blades which aim to reduce the tip leakage, the present disclosure does not alter the amount of leakage flow. In contrast, it alters the local pressure distribution to one more favorable for reducing the leakage mixing loss. This substantial reduction in mixing loss leads to a higher efficiency turbine.

Figure 8:
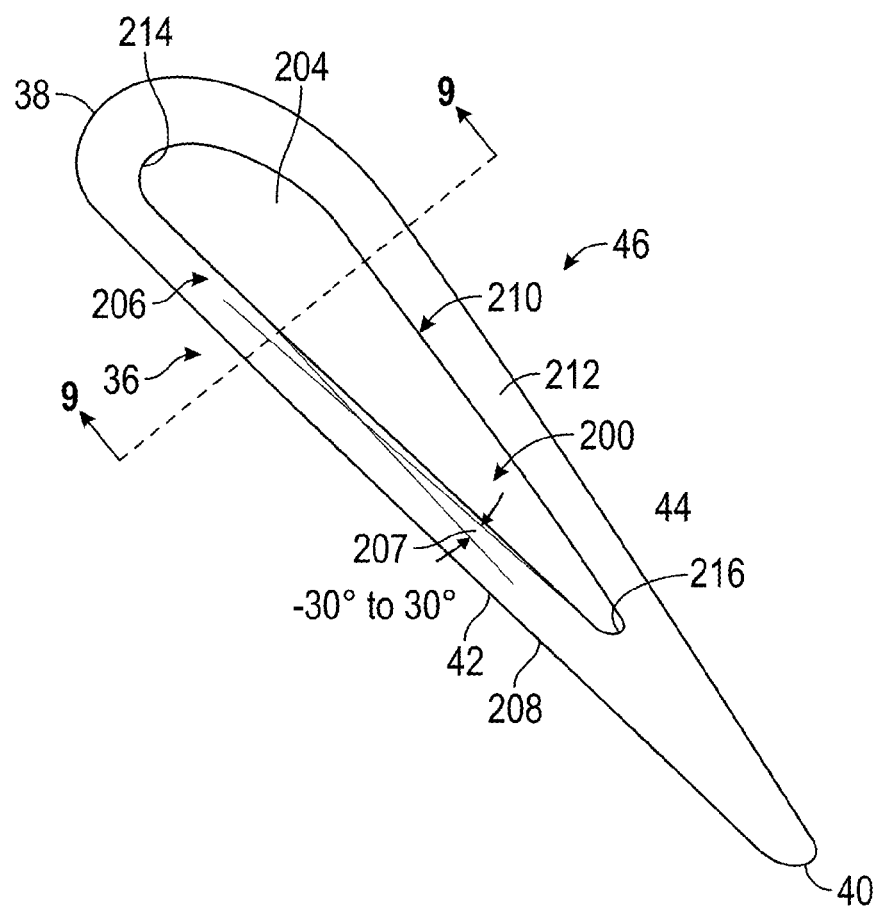
FIG. 8 is top view of a tip of a rotor blade in accordance with an embodiment of the disclosure.
Figure 9:
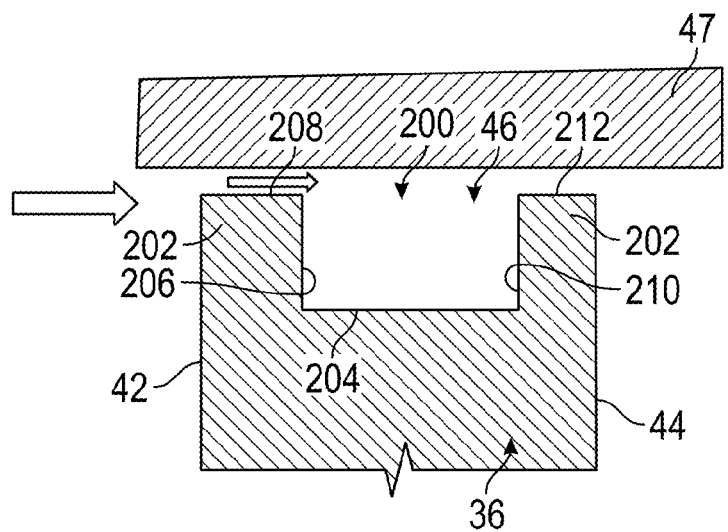
FIG. 9 is a view along lines 9-9 of FIG. 8.

Referring now to FIGS. 8 and 9, a top view of the tip 46 of the airfoil 36 in accordance with one non-limiting embodiment is disclosed. Here tip 46 is configured to have a squealer pocket 200 located in tip 46. In one embodiment, the squealer pocket 200 is used in combination with the tip vortex control technology described above with respect to at least FIGS. 1-6. The squealer pocket 200 comprises a cavity located in tip 46 that maintains a region or pocket of cooling fluid (e.g., air) along the tip of the airfoil, between the pressure surface and the suction surface. In one embodiment, the squealer pocket may have a plurality of cooling openings that are in fluid communication with a cooling fluid in order to provide the cooling air to the pocket 200. The cooling pocket is in one embodiment, surrounded by a wall or portion 202 that extends upwardly from a surface 204 of the squealer pocket 200. Wall or portion 202 is located between the leading edge 38, the trailing edge 40, the pressure side 42 and the suction side 44 of the airfoil 36.

In one embodiment an inner surface or first surface 206 of the wall or portion 202 located between at least the pressure side 42 and the squealer pocket 200 extends from surface 204 to a top surface 208 of the wall or portion 202 located between at least the pressure side 42 and the squealer pocket 200. In one embodiment, this inner surface 206 is configured to be arranged or have a convex configuration with respect to the pressure side 42 of the airfoil 36 as it extends from the leading edge 38 to the trailing edge 40 of the airfoil 36. The convex configuration may be represented by an angle 207, which is defined by the intersection of two lines tangent to surface 206 proximate to the apex of the convex portion of surface 206. In one embodiment, this angle may be between approximately −30 degrees and 30 degrees. Of course, angles greater or less than the aforementioned values are considered to be within the scope of various embodiments of the disclosure.

In addition, an inner surface or second surface 210 of the wall or portion 202 located between at least the suction side 44 and the squealer pocket 200 extends from surface 204 to a top surface 212 of the wall or portion 202 located between at least the suction side 44 and the squealer pocket 200. This inner surface 206 may also be configured to have a convex shape or have a convex configuration with respect to the suction side 44 of the airfoil 36 as it extends from the leading edge 38 to the trailing edge 40 of the airfoil 36. As illustrated in FIG. 9, these surfaces 206 and 210 may be in a facing spaced relationship with respect to each other and the cavity or squealer pocket 200 and the surface 204 are located therebetween.

Still further, portions 214 and 216 of another inner surface of the wall or portion 202 may be located between the squealer pocket 200 and the leading edge 38 and the trailing edge 40 of the airfoil 36. These portions 214, 216 may have a different surface configuration and are located between surfaces 206 and 210.

The combination of the tip vortex control technology described above with respect to at least FIGS. 1-6 and in combination with the squealer pocket 200 reduces the leakage over the turbine blade tip while providing additional performance benefits. In addition to reducing the leakage flow over the tip the squealer pocket 200 also reduces a heat load to the part. The squealer pocket configuration creates an effective labyrinth seal which reduces the amount of tip leakage between the tip 46 and a shroud 47 or blade outer air seal (BOAS), which brings with it a performance benefit. The squealer pocket provides thermal benefits as the pocket itself experiences lower heat transfer coefficients as the pocket acts as a mini-plenum which reduces the velocity of the gas path air in this region. In addition, the surfaces 204, 206 and 210 may be coated with any type of thermal barrier coatings, such as a ceramic coating (e.g., yttria stabilized zirconia), that do not get abraded off (even if a blade tip rub does occur) since they are recessed from the uppermost top tip surfaces. Accordingly, these thermal barrier coatings provide additional thermal benefits.

Figure 10:
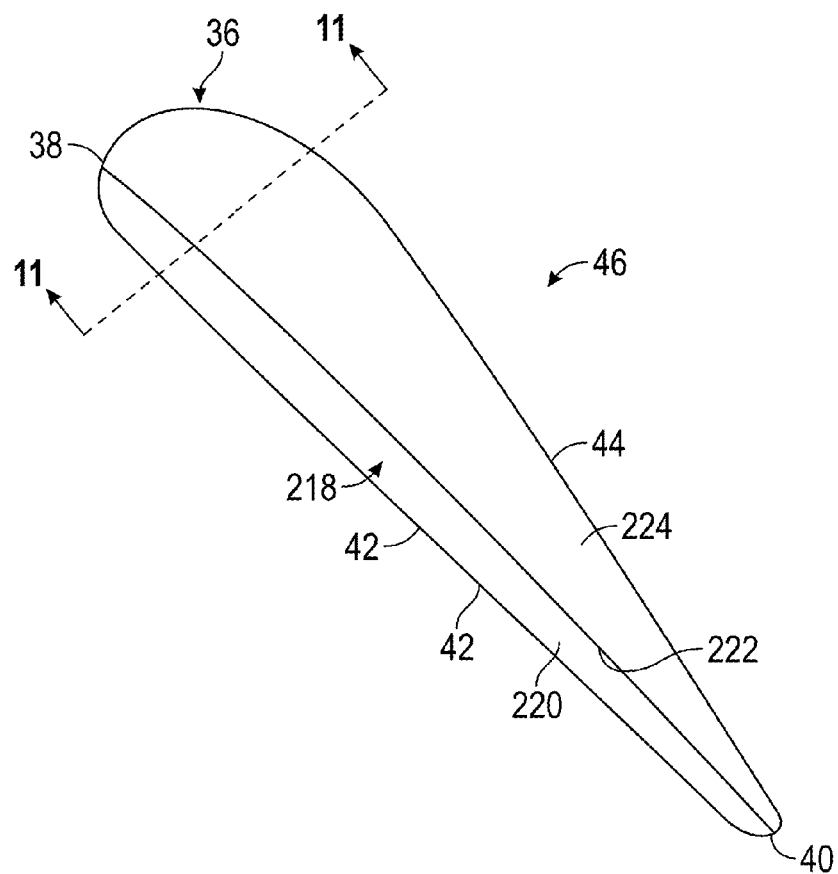
FIG. 10 is top view of a tip of a rotor blade in accordance with another embodiment of the disclosure.
Figure 11:
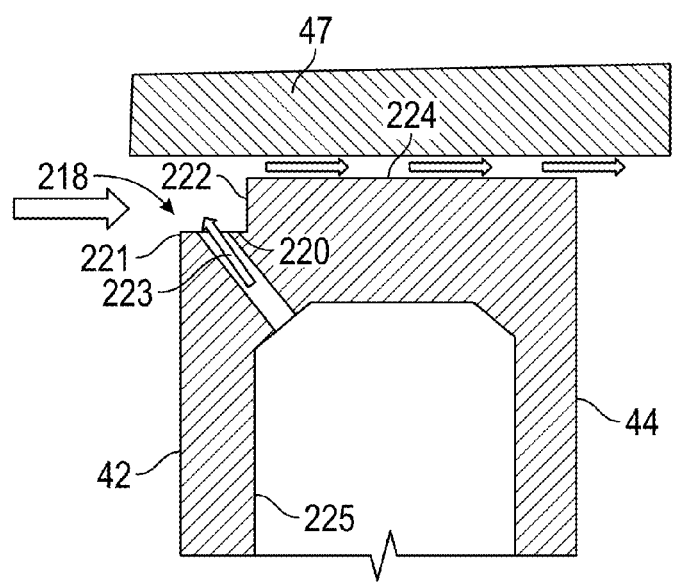
FIG. 11 is a view along lines 11-11 of FIG. 10.

Referring now to at least FIGS. 10 and 11, a top view of the tip 46 of the airfoil in accordance with another one non-limiting embodiment is disclosed. Here tip 46 is configured to have a tip shelf 218 located in tip 46 proximate to the pressure surface 42 of the airfoil 36. In one embodiment, the tip shelf 218 is used in combination with the tip vortex control technology described above with respect to at least FIGS. 1-6. In this embodiment, the tip shelf 218 has a ledge portion 220 extending from the pressure side 42 to a wall portion 222 extending upwardly from the ledge portion 220 to a top surface 224 of the tip 46. In one embodiment, the tip shelf 218 may extend from the leading edge 38 to the trailing edge 40. Alternatively, the tip shelf 218 may only extend along a portion of the tip 46 from the leading edge 38 to the trailing edge 40.

In one embodiment, the surface of wall portion 222 may be generally flat and straight and is parallel to the pressure side 42 of the airfoil 36 proximate to the tip shelf 218.

The combination of the tip vortex control technology described above with respect to at least FIGS. 1-6 and in combination with the tip shelf 218 reduces the leakage over the turbine blade tip reduces the leakage while providing additional performance benefits. In this embodiment, the tip shelf shape allows the cooling air to be placed where it is most beneficial and gets rid of a tip edge along the pressure surface of the airfoil that otherwise would be prone to rapid oxidation. In one embodiment, the tip shelf 218 may have a plurality of cooling openings 221 that are in fluid communication with a cooling fluid 223 in order to provide cooling air to the tip shelf 218 in order to prevent the deleterious effects of high temperatures at the tip of the airfoil. The cooling openings 221 may be in fluid communication with an internal cooling channel or conduit 225 in fluid communication with a source of cooling air. As mentioned above, the tip shelf 218 also removes the tip edge on the pressure side where the heat transfer coefficient is extremely high and is prone to rapid oxidation.

Figure 12:
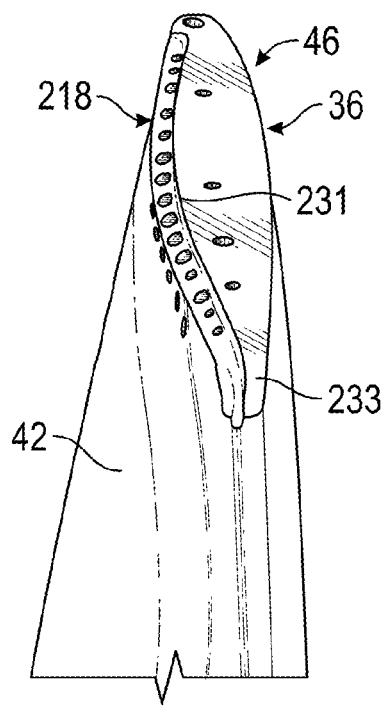
FIGS. 12 and 13 are perspective views of a tip of a rotor blade in accordance with yet another embodiment of the disclosure.
Figure 13:
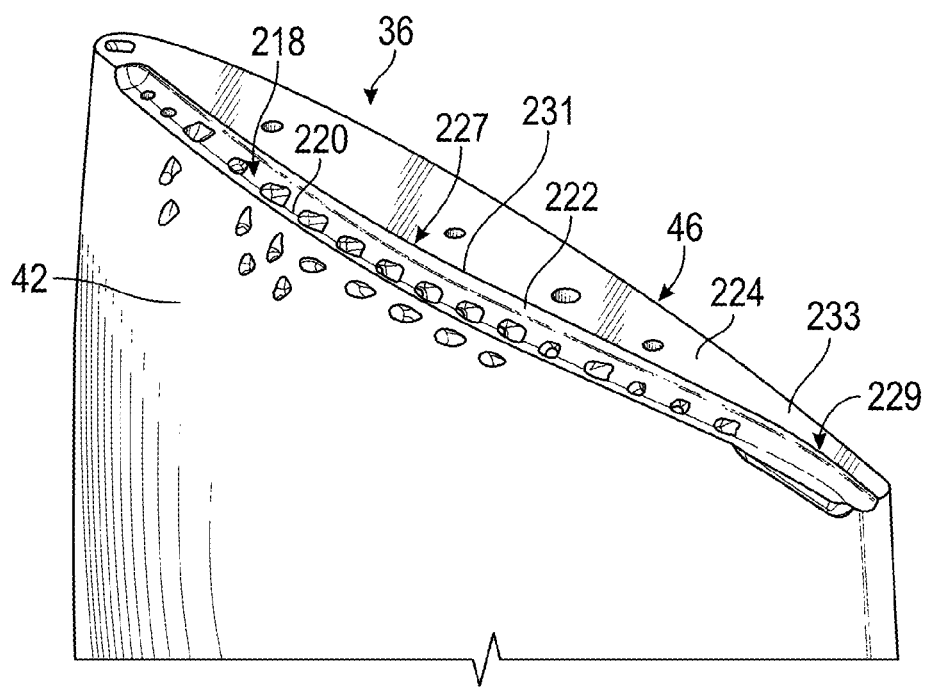
Figure 14:
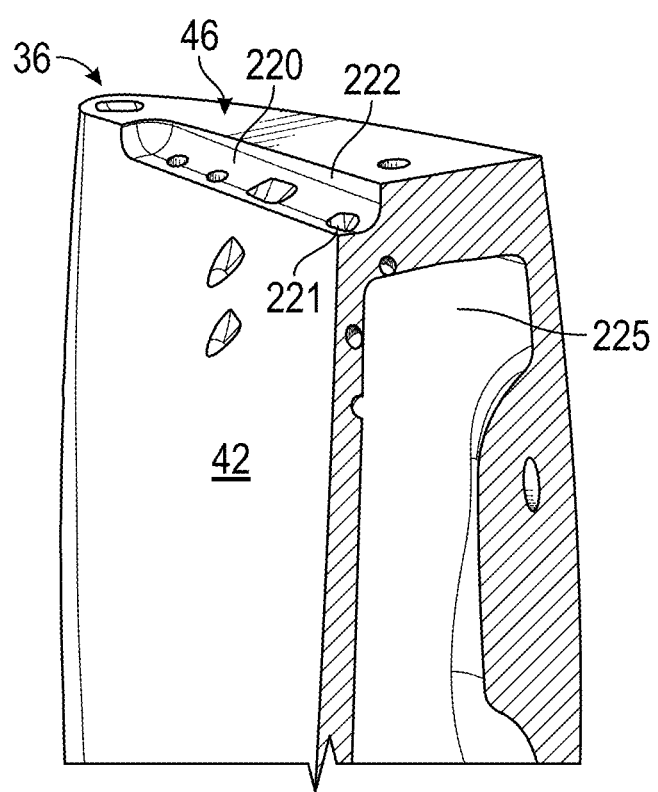
FIG. 14 is a cross-sectional of the tip of the rotor blade illustrated in FIGS. 12 and 13.

In yet another embodiment and as illustrated in at least FIGS. 12 and 13, a top view of the tip 46 of the airfoil 36 in accordance with yet another non-limiting embodiment is disclosed. In this embodiment, the tip 46 is configured to have a tip shelf 218 located in tip 46 proximate to the pressure surface 42 of the airfoil 36. In one embodiment, the tip shelf 218 is used in combination with the tip vortex control technology described above with respect to at least FIGS. 1-6. In this embodiment, the tip shelf 218 has a ledge portion 220 extending from the pressure side 42 to a wall portion 222 extending upwardly from the ledge portion 220 to a top surface 224 of the tip 46. In one embodiment, the wall portion 222 may have a convex configuration 231 with respect to pressure surface 42. In one embodiment, the convex configuration 231 of the wall portion may extend along a portion of the wall portion 222. In one configuration, the convex configuration 231 of the wall portion 222 may extend along more than 50% of the wall portion 222 but not the entire length of the wall portion 222. In yet another embodiment, the convex configuration 231 of the wall portion may extend along the entire portion of the wall portion 222. Of course, any other lengths of the convex configuration 231 with respect to the wall portion 222 are considered to be within the scope of various embodiments of the present disclosure. Alternatively, the wall portion 222 may have a generally straight configuration as shown in FIGS. 10 and 11. Still further and in yet another alternative embodiment, the wall portion 222 may have a convex portion 231 and a concave portion 233. In one embodiment, the concave portion 233 is located proximate to the trailing edge 40 of the airfoil 36. In addition, the ledge portion 220 may have localized concave portion 227 as well as a localized convex portion or surface 229, which may result in wall portion 222 having varying heights as it extends upwardly from ledge portion 220. Thus and in this embodiment, the tip shelf 218 may have both convex and concave inflections in the surface or ledge portion 220 as well as the wall portion 222. Tip shelf 218 may extend from the leading edge 38 to the trailing edge 40. Alternatively, the tip shelf 218 may only extend along a portion of the tip 46 from the leading edge 38 to the trailing edge 40. FIG. 14 is a partial cross-sectional view of the tip 36 illustrated in FIGS. 12 and 13.

The combination of the tip vortex control technology described above with respect to at least FIGS. 1-6 and in combination with the tip shelf 218 reduces the leakage over the turbine blade tip reduces the leakage while providing additional performance benefits. In this embodiment, the tip shelf shape allows the cooling air to be placed where it is most beneficial and gets rid of a tip edge along the pressure surface of the airfoil that otherwise would be prone to rapid oxidation. In one embodiment, the tip shelf 218 may have a plurality of cooling openings 221 that are in fluid communication with a cooling fluid in order to provide cooling air to the tip shelf 218 in order to prevent the deleterious effects of high temperatures at the tip of the airfoil. The cooling openings 221 may be in fluid communication with an internal cooling channel or conduit 225 in fluid communication with a source of cooling air. As mentioned above, the tip shelf 218 also removes the tip edge on the pressure side where the heat transfer coefficient is extremely high and is prone to rapid oxidation.

Figure 15:
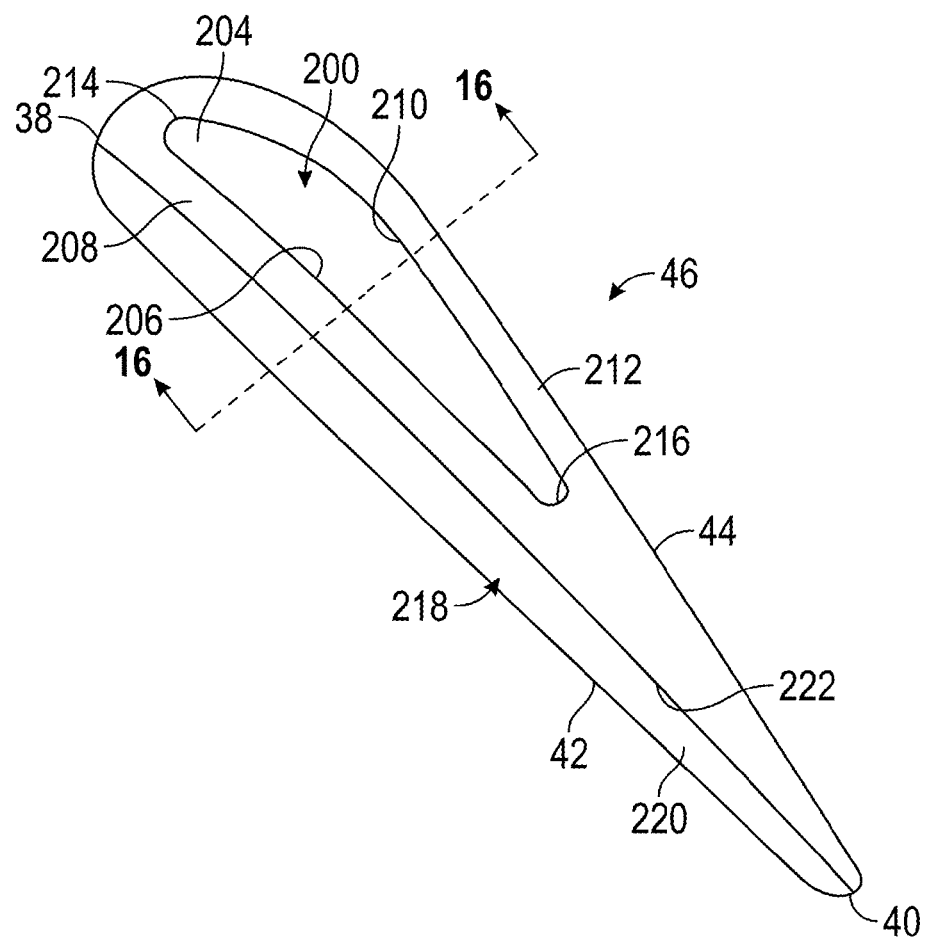
FIG. 15 is top view of a tip of a rotor blade in accordance with yet another embodiment of the disclosure.
Figure 16:
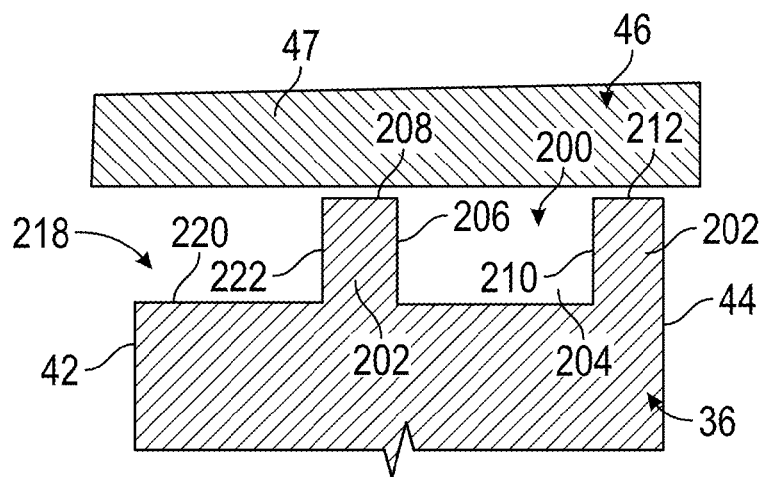
FIG. 16 is a view along lines 16-16 of FIG. 15.
Figure 17:
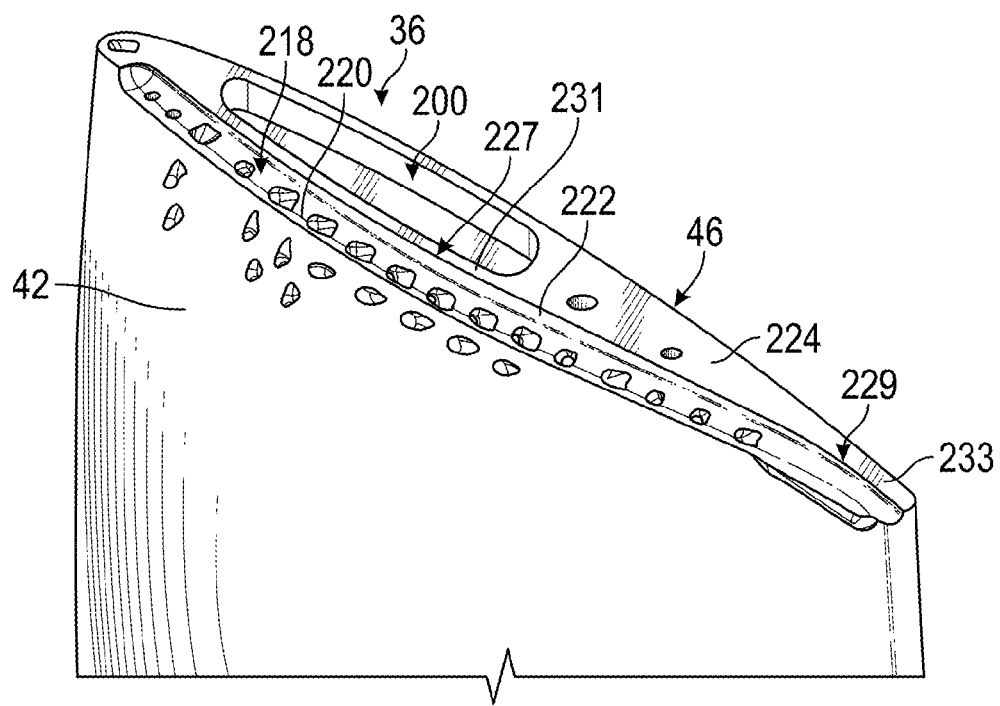
FIG. 17 is a perspective view of a tip of a rotor blade in accordance with yet another embodiment of the disclosure.

In yet another embodiment and as illustrated in at least FIGS. 15-17, a top view of the tip 46 of the airfoil 36 in accordance with yet another non-limiting embodiment is disclosed. Here tip 46 is configured to have a both the squealer pocket 200 and the tip shelf 218 as described herein with respect to any of the embodiments described in at least FIGS. 8-14. Again, these features are in combination with the tip vortex control technology described above with respect to at least FIGS. 1-6.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A rotor blade for a gas turbine engine, comprising:
   an attachment;
   an airfoil extending from the attachment to a tip, wherein the airfoil has a stagger angle that changes as the airfoil extends between the attachment and the tip, the airfoil further comprising a base region disposed adjacent to the attachment, a tip region, and a transition region located between the base region and the tip region; wherein a rate of the change of the stagger angle in the transition region is greater than a rate of the change of the stagger angle in the base region; wherein the rate of the change of the stagger angle in the transition region is greater than a rate of change of the stagger angle in the tip region; and wherein the airfoil has a chord that increases as the airfoil extends from the base region to the tip; and
   a tip shelf located in a surface of the tip proximate to a pressure side of the airfoil, wherein the tip shelf has a ledge portion extending from the pressure side to a wall portion extending upwardly from the ledge portion to the tip and wherein the wall portion is configured to have a convex portion with respect to the pressure side of the airfoil as it extends from a leading edge to a trailing edge of the airfoil.

2. The rotor blade of claim 1, wherein the ledge portion has a concave portion that results in the wall portion having varying heights as it extends upwardly from the ledge portion.

3. The rotor blade of claim 1, wherein the ledge portion has a convex portion that results in the wall portion having varying heights as it extends upwardly from the ledge portion.

4. The rotor blade of claim 2, wherein the ledge portion also has a convex portion that results in the wall portion having varying heights as it extends upwardly from the ledge portion, wherein the convex portion of the ledge portion is located proximate to the trailing edge of the airfoil and wherein the concave portion of the ledge portion comprises greater than 50% of the ledge portion.

5. The rotor blade of claim 1, wherein the convex portion of the wall portion comprises at least 50% of the wall portion that extends from the leading edge to the trailing edge of the airfoil.

6. The rotor blade of claim 1, further comprising a squealer pocket located in a surface of the tip.

7. The rotor blade of claim 2, further comprising a squealer pocket located in a surface of the tip.

8. The rotor blade of claim 3, further comprising a squealer pocket located in a surface of the tip.

9. The rotor blade of claim 4, further comprising a squealer pocket located in a surface of the tip.

10. The rotor blade of claim 1, wherein another portion of the wall portion is concave with respect to pressure side of the airfoil and the another portion is located proximate to the trailing edge of the airfoil.

11. The rotor blade of claim 6, wherein the squealer pocket is at least partially surrounded by a first surface of a wall located between the squealer pocket and the pressure side of the airfoil, wherein the first surface of the wall has a convex configuration with respect to the pressure side of the airfoil as it extends from a leading edge to a trailing edge of the airfoil.

12. The rotor blade of claim 11, wherein the squealer pocket is at least partially surrounded by a second surface of a wall located between the squealer pocket and a suction side of the airfoil, wherein the second surface of the wall has a convex configuration with respect to the suction side of the airfoil as it extends from the leading edge to the trailing edge of the airfoil.

13. The rotor blade of claim 12, wherein the first surface and the second surface are in a facing spaced relationship with respect to each other and the squealer pocket is located between the first surface and the second surface.

14. A gas turbine engine, comprising:
    a compressor section;
    a combustor section; and
    a turbine section; wherein at least one of the turbine section and compressor section includes a plurality of rotors having a plurality of radially disposed rotor blades at least some of the plurality of radially disposed rotor blades having:
    an attachment;
    an airfoil extending from the attachment to a tip, wherein the airfoil has a stagger angle that changes as the airfoil extends between the attachment and the tip, the airfoil further comprising a base region disposed adjacent to the attachment, a tip region, and a transition region located between the base region and the tip region; wherein a rate of the change of the stagger angle in the transition region is greater than a rate of the change of the stagger angle in the base region; wherein the rate of the change of the stagger angle in the transition region is greater than a rate of change of the stagger angle in the tip region; and wherein the airfoil has a chord that increases as the airfoil extends from the base region to the tip;
    a tip shelf located in a surface of the tip proximate to a pressure side of the airfoil, wherein the tip shelf has a ledge portion extending from the pressure side to a wall portion extending upwardly from the ledge portion to the tip and wherein the wall portion is configured to have a convex portion with respect to the pressure side of the airfoil as it extends from a leading edge to a trailing edge of the airfoil.

15. The gas turbine engine as in claim 14, wherein the wall portion further comprises a concave portion that is located proximate to the trailing edge of the airfoil.

16. The gas turbine engine of claim 15, further comprising a squealer pocket located in a surface of the tip.

17. A rotor blade for a gas turbine engine, comprising:
   an attachment;
   an airfoil extending from the attachment to a tip;
   a tip shelf located in a surface of the tip proximate to a pressure side of the airfoil; and
   wherein the airfoil has a stagger angle that changes as the airfoil extends between the attachment and the tip, the airfoil further comprising a base region disposed adjacent to the attachment, a tip region, and a transition region located between the base region and the tip region; wherein a rate of the change of the stagger angle in the transition region is greater than a rate of the change of the stagger angle in the base region; wherein the rate of the change of the stagger angle in the transition region is greater than a rate of change of the stagger angle in the tip region; and wherein the airfoil has a chord that increases as the airfoil extends from the base region to the tip, wherein the tip shelf has a ledge portion extending from the pressure side to a wall portion extending upwardly from the ledge portion to the tip.

18. The rotor blade of claim 17, wherein the wall portion is generally flat and straight and is parallel to the pressure side proximate to the tip shelf.

19. The rotor blade of claim 17, further comprising a squealer pocket located in a surface of the tip and wherein the wall portion is configured to have a convex portion with respect to the pressure side of the airfoil as it extends from a leading edge to a trailing edge of the airfoil and wherein the wall portion further comprises a concave portion that is located proximate to the trailing edge of the airfoil.

20. The rotor blade of claim 18, further comprising a squealer pocket located in a surface of the tip.

* * * * *